INVENTOR
Charles William Berthiez
By
ATTORNEY

INVENTOR
Charles William Berthiez
By George H. Gorey
ATTORNEY

Nov. 1, 1955

C. W. BERTHIEZ 2,722,162

ARRANGEMENT FOR SUPPORTING A MOVABLE MACHINE
MEMBER ON HORIZONTAL SLIDEWAYS

Filed Aug. 13, 1951

INVENTOR
Charles William Berthiez
By
ATTORNEY

United States Patent Office 2,722,162
Patented Nov. 1, 1955

2,722,162

ARRANGEMENT FOR SUPPORTING A MOVABLE MACHINE MEMBER ON HORIZONTAL SLIDEWAYS

Charles William Berthiez, La Cote, Bizy Vernon, France, assignor to société anonyme dite: Societe Nouvelle de Construction de Machines Outils et d'Outillages Procedes C. W. B., Paris, France Application August 13, 1951, Serial No. 241,678

Claims priority, application France March 21, 1951

6 Claims. (Cl. 90—16)

This invention relates to an improved arrangement for supporting a movable machine member on horizontal slideways, and more particularly to movable machine-tool member.

It often happens that on modern machine tools, the dimensions of which are steadily increasing, the weight of the movable members becomes considerable. This is the case, for instance, with the movable headstocks of large milling and boring machines. When these heavy headstocks are designed to slide on horizontal runways or slideways, a great amount of strength is required to shift them, owing to the considerable friction which occurs between the surfaces of the conventional runways supporting such headstocks.

Moreover, the accuracy of the machine may be slightly affected when a headstock of this kind protrudes out of its supporting slideways, because the weight of the overhanging portion of the head stock is not supported and that portion of the headstock tends to drop. Therefore, when the headstock is overhanging, the axis of the spindle is not exactly in alignment with the position it occupies when the whole headstock is bearing on the full length of the slideways. As slight as the difference may be, such a condition is to be strictly avoided in modern accurate machine tools. Not only the accuracy of the rotating spindle is affected by such conditions when the headstock overhangs, but the oil film on the slideways is affected by the slant of the headstock and, therefore, is crushed out at the ends of the cooperating bearing portions. This may result in seizure of the metal of the sliding surfaces and in considerable damage to the machine parts involved.

The object of the present invention is an arrangement designed to overcome these drawbacks. This arrangement allows the specific pressure on the runways or slideways to be decreased to any desired extent and also to be uniformly maintained throughout the length of the slideways irrespective of the position of the headstock relative to its supporting member, i. e., either in an overhanging position or otherwse.

According to the invention, the machine element supporting the movable member is provided with a rollway parallel to the horizontal runways, such movable member being at least partly supported in a resilient manner by a roller device adapted to roll on said rollway and arranged substantially so that the resultant supporting force acts in a vertical line passing through the centre of gravity of the movable member.

In this manner, the surfaces of the runways or slideways that are in sliding contact with the surfaces of the movable member are subjected only to a slight specific pressure intended merely to accurately guide the movable member on its supporting element. This results in a great smoothness of operation and eliminates the wear of the runways. The machine then retains its full accuracy.

The resilient connection between the roller system and the movable member preferably consists in an adjustable spring device.

Further features of the invention will become apparent from the following description and from the accompany drawings given merely by way of examples and in which.

Figure 1:
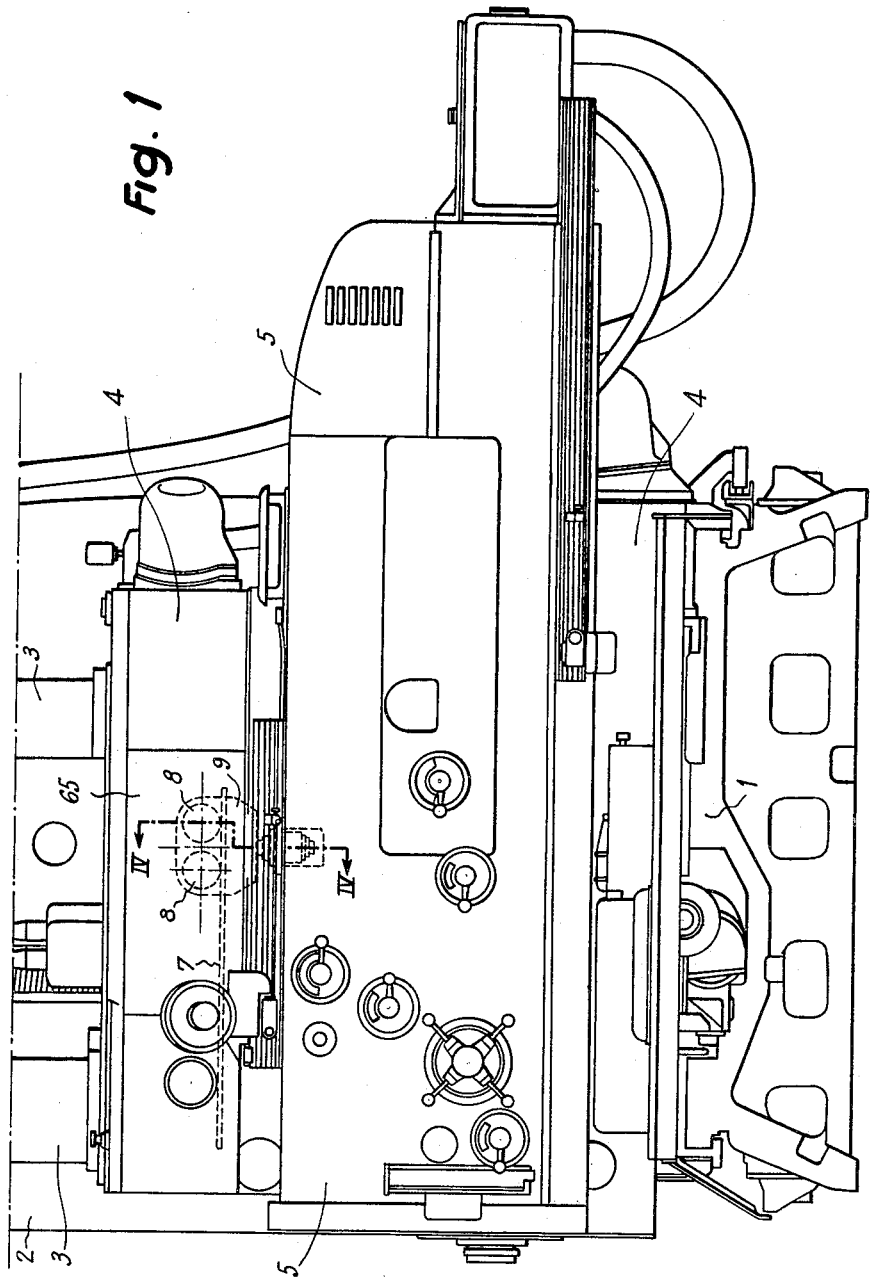
Fig. 1 shows a front view of the device according to the invention applied to a milling and boring machine with a headstock movable along horizontal runways carried by a vertically movable slide.
Figure 2:
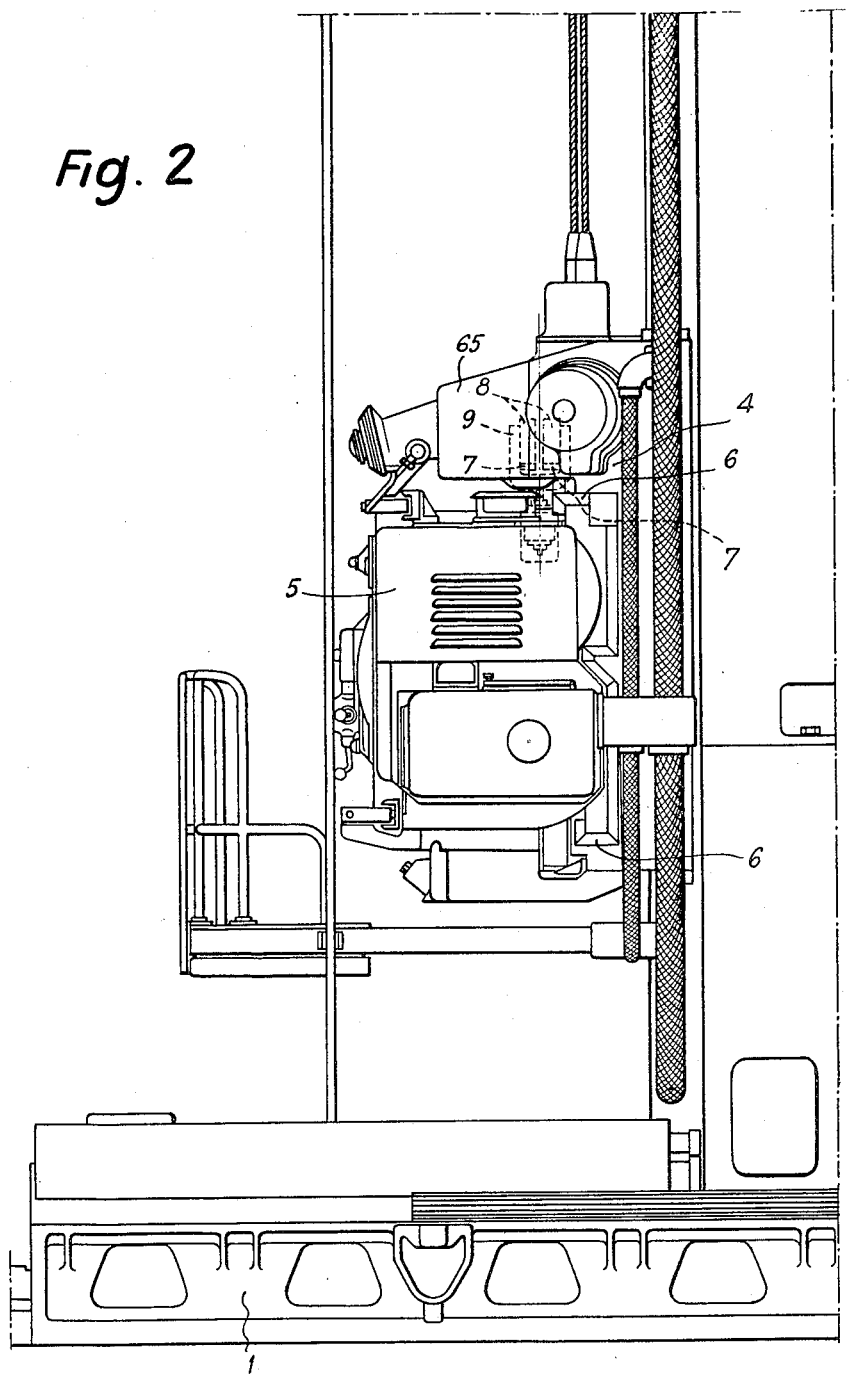
Fig. 2 is a corresponding side view.

In Figs. 1 and 2 is shown the main portion of a large milling and boring machine, that is to say, the bed 1 on which can be shifted a column 2 provided with vertical runways 3 along which can move a slide 4 acting as a support for a headstock 5. This headstock can be moved horizontally along runways 6 carried by the slide 4. According to the invention, the slide 4 is provided with two rails 7 parallel to runways 6 and on which can roll a carriage formed by rollers 8 mounted in a yoke-piece 9 which is resiliently connected to the head stock 5 at a point which is located substantially on the vertical line passing through the centre of gravity of the headstock so as to support a substantial part or all of the headstock weight. The rollers 8, whatever the position of the headstock may be on its supporting member, are always in contact with the rollways.

Figure 3:
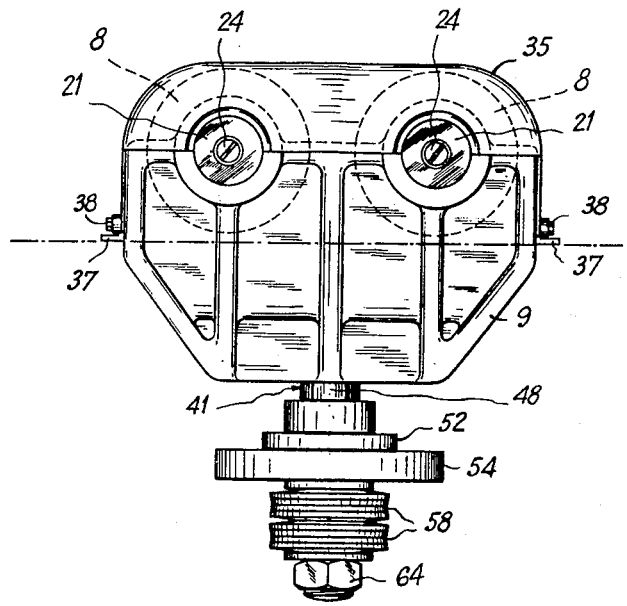
Fig. 3 is, on a larger scale, a front view of the small carriage supporting the headstock, and Fig. 4, a fractional section along line IV—IV of Fig. 1, on a still larger scale.
Figure 4:
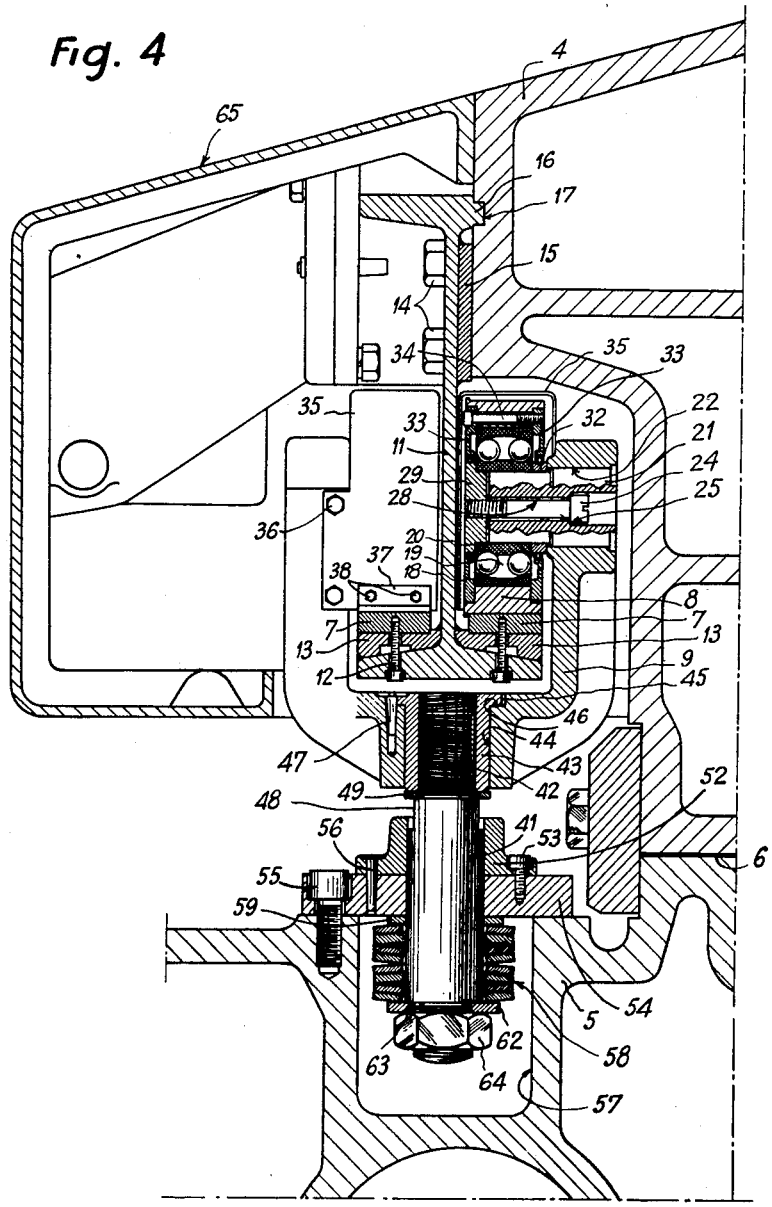

The mounting of this roller device will be described having reference to Figs. 3 and 4. The two rails 7 are secured by means of screws 12 at the upper side of the lower flanges of an I-beam 11, intermediary bars 13 being inserted therebetween to compensate for the slope of the I-beam flange, these bars having a cross section in the shape of a right angle trapezium, so that their upper face is horizontal, whereas their lower face is inclined and rests on the lower flanges of the I-beam 11. For the sake of security, the intermediary bars 13 are longitudinally welded along the I-beam 11.

The I-beam 11 itself is secured by screws 14 on the front face of the headstock-supporting slide 4, a longitudinal intermediary plate 15 being inserted and welded on the web of the I-beam to insure true positioning of the beam and its bars 13. The vertical positioning of the I-beam relative to the slide 4 is achieved by means of a tongue 16 machined out of the upper flange of the I-beam and fitting in a complementary groove cut in the front face of the slide 4. The two rails 7 are thus suspended from the slide 4 in a well defined horizontal position and have a direction parallel to that of the runways 6 of the slide 4.

The yoke-piece 9 has a flange on each side of the I-beam 11, and on each flange are mounted two rollers 8 in such a way that two rollers rest on each one of the two rails 7. All the rollers are identical and it is therefore, sufficient to describe one of them.

Each roller 8 is fitted over the outer race 18 of a ball bearing 19 the inner race 20 of which is mounted on a shouldered stud 21 held in place in a bore 22 of the yoke-piece 9 by a screw 24 the head of which bears on a shoulder 25 of a hole 28 bored in the stud 21. The threaded end of said screw is screwed in a flanged washer 29 bearing against the inner race 20 of the roller bearing. A spacing washer 32 is provided between the inner race of the roller bearing and the internal face of the yoke-piece 9. Deflectors 33 intended to prevent the grease from flowing out of the roller bearing are held in place on the roller by means of screws 34. Finally, each assembly formed by two rollers 8 located on the same side of the web of the I-beam 11 is covered by a hood 35 secured to the sides of the yoke-piece 9 by screws 36. Small angle bar elements 37, which are secured by screws 38 on both ends of the hood 35 level with the top surface of rails 7, are formed into scrapers which are in sliding frictional engagement with the rails 7 during the shifting of the roller device, so as to keep them perfectly clean.

The yoke-piece 9 is connected to the headstock 5 by means of a resilient connection consisting in a vertical spindle 41 secured by its upper threaded end 42 in an internally threaded sleeve 43 fitted in a recess 44 of the yoke-piece 9 and resting, by means of its flange 45, on the annular face of a counterbore 46 provided in the yoke-piece recess 44. Taper dowel pins 47 engaging the flange 45 and driven in the hub of the yoke 9 prevent any rotational movement of the sleeve 43 in the yoke-piece. The spindle 41 is provided with two flat portions 48 adapted to be engaged by a wrench for screwing the spindle 41 in the sleeve 43 when assembling the machine, an adjusting shim washer 49 of a suitable thickness making it possible to adjust the tension of the resilient connection, as will be seen further on.

The spindle 41 passes through a flange 52 secured by means of screws 53 to a plate 54 which rests on an upper trued face of the headstock 5 and which is held in position on said face by screws 55. Taper dowel pins 56 ensure a perfect relative positioning between the flange 52 and the plate 54. The spindle 41 thus is disposed so that its axis is in a vertical line passing through the center of gravity of the headstock 5. A recess 57 is provided on the body of the headstock 5 to house the lower end of the spindle 41 on which is mounted a group of resilient washers 58, for instance, of the spring-washer type, such washer group being held tight between a washer 59 bearing against the lower face of plate 54 and a washer 62 locked against a shoulder 63 of the lower end of the spindle 41 by means of a nut 64.

The whole of the device is covered by a protecting hood 65 secured to the slide 4.

The operation of the device just described is the following:

The strength of the spring washers 58 and the thickness of the adjusting shim washer 49 are selected in such a way that the rollers 8 are made to support a substantial portion or all of the weight of the headstock 5 through the medium of the yoke-piece 9 and of the spindle 41. By reason of the fact that the axis of such resilient support is substantially situated on the vertical line passing through the centre of gravity of the headstock 5, so that the resultant supporting force acts in this line, the runways 6 are subjected only to a small specific pressure intended merely to guide the headstock 5 slidably moving on its slide 4 with perfect accuracy. The effort required to move the headstock on its slide is, therefore, considerably lessened by the presence of the supporting rollers. This results in greater smoothness of operation and eliminates or reduces wear of the runways so that the machine retains its full accuracy.

Of course, the present invention is not restricted to the embodiment described and represented which has been selected only by way of example. The description refers to an embodiment according to the invention as applied to the novel support of the headstock in a large milling and boring machine, but the scope of the invention would not be departed from were the main features of this resilient suspension roller device adopted for any other machine member adapted to slide along horizontal runways.

What I claim is:

1. In a machine having an element providing a horizontally extending slideway surface, and a member providing a surface in sliding engagement with said slideway surface and for movement of said member horizontally along said slideway surface, the combination therewith of means providing an elongated rollway surface and supported on said element with the length of said rollway surface extending parallel to the horizonal extent of said slideway surface, a roller disposed in rolling contact with said rollway surface for rolling movement horizontally therealong, and means connecting said roller and said member for supporting said member on said roller for movement of said connecting means and said member alongs said rollway upon said rolling movement of said roller therealong concomitantly with sliding movement of said member along said slideway surface, said connecting means being connected to said member so that the resultant force supporting said member acts in a line passing substantially through the center of gravity of said member.

2. In a machine having an element providing a horizontally extending slideway surface, and a member providing a surface in sliding engagement with said slideway surface and for movement of said member horizontally along said slideway surface, the combination therewith of means providing an elongated rollway surface and supported on said element with the length of said rollway surface extending parallel to the horizontal extent of said slideway surface, a roller disposed in rolling contact with said rollway surface for rolling movement horizontally therealong, and means connecting said roller and said member for suspending said member from said roller for movement of said connecting means and said member along said rollway upon said rolling movement of said roller therealong concomitantly with sliding movement of said member along said slideway surface, said connecting means being connected to said member at a point thereon disposed on a vertical line passing substantially through the center of gravity of said member.

3. In a machine as defined in claim 2, said means connecting said roller and said member for suspending said member from said roller comprising a resilient means for resiliently transmitting the suspending force between said roller and said member.

4. In a machine having an element providing a horizontally extending slideway surface, and a member providing a surface in sliding engagement with said slideway surface and for movement of said member horizontally along said slideway surface, the combination therewith of two elongated rails supported on said element in spaced relation with the lengths thereof extending horizontally parallel to said slideway surface, a carriage providing spaced flanges in planes generally parallel to the lengthwise extent of said rails, rollers carried by the respective flanges for rolling contact with and along the respectively adjacent rails concomitantly with movement of said carriage lengthwise along said rails, a suspension rod connected to said carriage with its length substantially vertical in a plane disposed between and parallel to the lengths of said rails, said rod being connected to said member at a point thereon such that the vertical line of said rod passes substantially through the center of gravity of said member, and an adjustable spring device connected to and disposed between said suspension rod and said member to provide resilient suspension of said member on said rails.

5. In a machine as defined in claim 1, a hood mounted on said element and extending along and enclosing said rollway, a second hood carried by said member supporting means and enclosing said roller, and a scraper attached to said second hood in sliding scraping engagement with said rollway surface as said roller rolls along said rollway surface.

6. In a milling and boring machine, the combination with an upright providing a vertically extending slideway surface, a slide member supported on said upright for movement thereof upwardly and downwardly upon said vertical slideway surface, said slide member providing thereon a horizontally extending slideway surface, and a milling and boring headstock supported by said slide member for horizontal movement of said headstock along said horizontal slideway surface of said slide member, of means providing an elongated rollway surface and supported on said slide member with the length of said rollway surface extending parallel to the horizontal extent of said slideway surface of said slide member, a roller disposed in rolling contact with said rollway surface for rolling movement horizontally therealong, and means connecting said roller to said headstock for supporting said headstock upon said roller for movement of said connecting means and said headstock along said rollway upon said rolling movement of said roller therealong concomitantly with sliding movement of said headstock along said horizontal slideway, said connecting means being connected to said headstock at a point thereon disposed on a vertical line passing substantially through the center of gravity of said headstock, said connecting means comprising a resilient means for resiliently transmitting the supporting force between said roller and said headstock.

References Cited in the file of this patent

UNITED STATES PATENTS

| | | |
|---|---|---|
| 1,381,188 | Gury | June 14, 1921 |
| 1,443,789 | Humphreys | Jan. 30, 1923 |
| 1,807,451 | Sebbins | May 26, 1931 |
| 2,242,293 | Eden et al. | May 20, 1941 |
| 2,565,853 | Jacobson | Aug. 28, 1951 |
| 2,568,524 | Verderbes | Sept. 18, 1951 |
| 2,605,678 | Armitage et al. | Aug. 5, 1952 |

FOREIGN PATENTS

| | | |
|---|---|---|
| 244,288 | Great Britain | Dec. 17, 1925 |